Feb. 3, 1970 M. BROMBERG 3,493,205
BUSHING WITH STRAIN RELIEF
Filed June 26, 1968
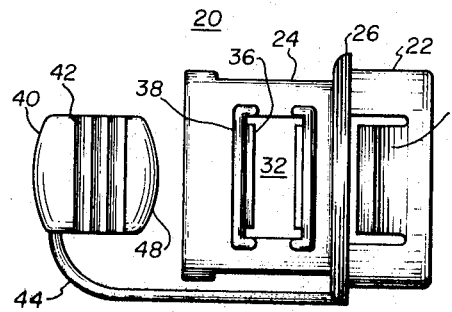
FIG. 1
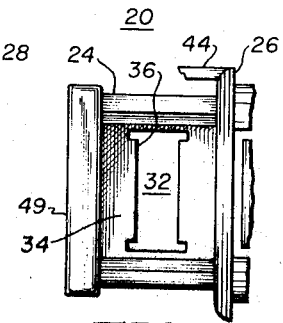
FIG. 2
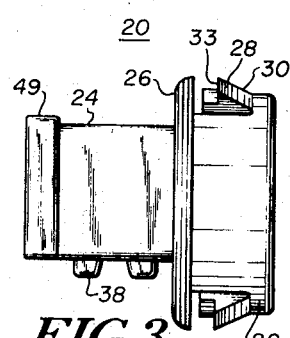
FIG. 3
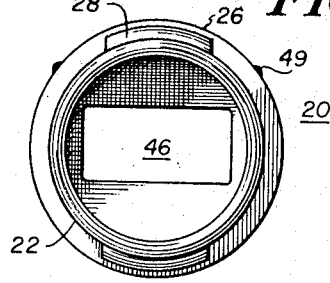
FIG. 4
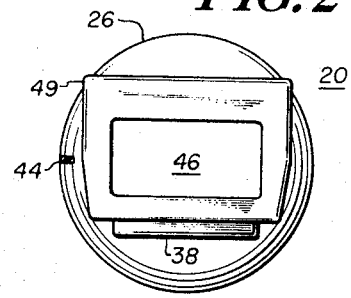
FIG. 5
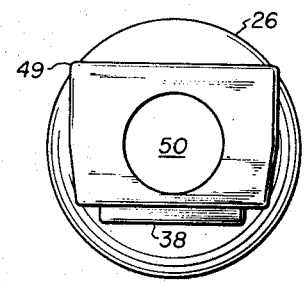
FIG. 6
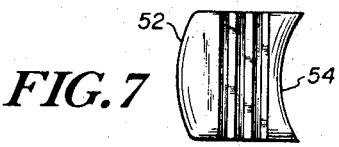
FIG. 7
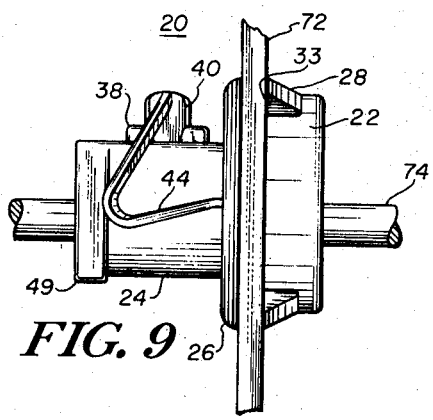
FIG. 8
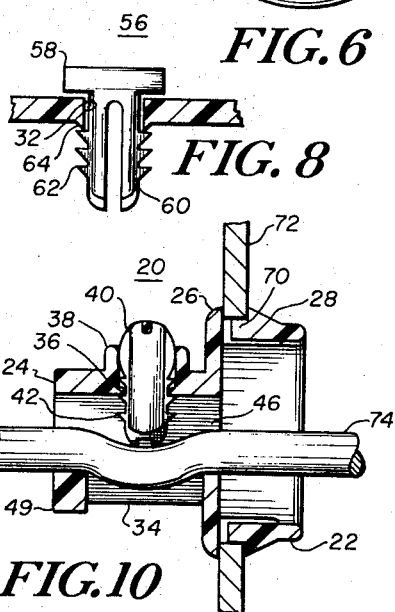
FIG. 9
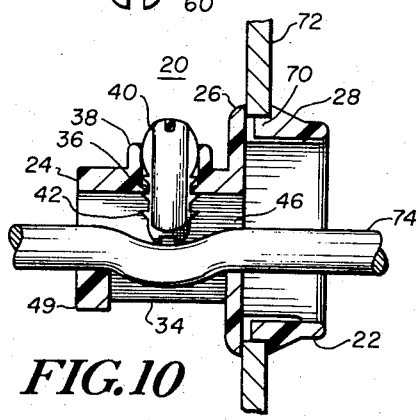
FIG. 10
INVENTOR.
MENASHE BROMBERG
BY 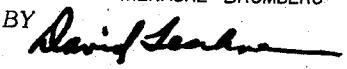
ATTORNEY

United States Patent Office 3,493,205
Patented Feb. 3, 1970

3,493,205
BUSHING WITH STRAIN RELIEF
Menashe Bromberg, West Orange, N.J., assignor to Thomas & Betts Corporation, Elizabeth, N.J., a corporation of New Jersey
Filed June 26, 1968, Ser. No. 740,119
Int. Cl. F16l 5/00
U.S. Cl. 248—56    10 Claims

ABSTRACT OF THE DISCLOSURE

The invention is directed to a bushing having strain relief features. The bushing is constructed of a first portion operating as the bushing and a second portion incorporating the strain relief features. The bushing portion is provided with a plurality of cantilever mounted flexure members which permit insertion of the bushing into an aperture in a bulkhead with later expansion to seize the back portion of the bulkhead and prevent withdrawal of the bushing therefrom. The strain relief portion, coupled via a flange to the first body portion has in it two oppositely positioned apertures. The first of the apertures is provided with pawl means to engage the rachet teeth of a plug member inserted within this aperture. When an article such as a nonmetallic sheathed conductor is inserted into the axial passage within the bushing, the forces exerted by the plug member within the first aperture causes the article to be partly deflected into a second aperture and to be locked against withdrawal thus providing strain relief against axial forces applied to the conductor once it has been positioned within the bushing.

BACKGROUND OF THE INVENTION

Field of the invention

The invention is directed to the field of installing nonmetallic sheathed conductors through bulkheads such as the walls of electrical protective enclosures. Although the description to follow is in terms of the entrance of electrical conductors into protective electrical enclosures it should be understood that a similar type of bushing may be employed wherein any sort of deformable article such as a hose, or the like, is to be passed through a bulkhead.

Description of the prior art

In known prior art devices combination bushing and strain relief devices are provided by means of a split bushing having on an inner surface thereof a conductor engaging surface to provide strain relief. The conductor must be positioned within the split bushing and the entire assembly, that is the bushing and conductor, inserted within the knock-out of an electrical enclosure simultaneously. The insertion of the bushing within the knock-out, simultaneously installs the bushing within the knock-out and applies the required strain relief to the conductor placed within the bushing. It is not possible, however, under these circumstances to preassemble the bushing to the knock-out of the electrical enclosure to permit the later insertion of the conductor therethrough. Nor is it possible to first preinstall the bushing to the conductor which has been cut to fixed length and then install the conductor, with its bushing, directly to the knock-out of the electrical protective enclosure. Further, the size of the knock-out, or aperture, with respect to the size of the bushing is greatly determinative of the strain relief which may be provided by this type of bushing. That is to say, an aperture of excess diameter will minimize the closure of the portions of the split bushing and thus will greatly reduce the effective strain relief thereof. Further, the bushing size determines the conductor size and different bushings must be used for different conductor sizes.

SUMMARY OF THE INVENTION

The present invention overcomes the difficulties noted above with respect to prior art devices by providing a bushing with strain relief features which can be readily installed to conductors or to electrical enclosures and wherein there is no requirement for the concurrent application of the bushing to the knock-out and the application strain relief to the conductor.

The invention consists of a bushing having a first body portion which constitutes the bushing having a second body portion which provides for strain relief. The bushing portion is provided with cantilevered flexure members which can be deflected out of their normal position to facilitate the placement of the bushing portion within the knock-out of an electrical protective enclosure. These flexure members will then return from their deflected position to their normal position to prevent withdrawal of the bushing from the knock-out. The strain relief portion comprises a throat which will receive theirin the article, or conductor, to be positioned within the electrical protective enclosure. Apertures are placed on opposite sides of the second body portion along the line of the article moving through the bushing. The first of these apertures is provided with guide means to facilitate the entry of a plug member. Additionally, adjacent the same aperture are a set of pawls which will engage rachet teeth found along the surface of the plug member to lock the plug member to a position which has been established by insertion of the plug member into such first aperture. The plug member may be set in place as determined by the strain relief desired and the conductor size, permitting the bushing to be used with a wide range of conductor sizes. The second aperture is provided for the deforming of the article, or conductor placed within the bushing, and together with the effects of the plug member provide the required strain relief. A tether is provided between the bushing and the plug member to prevent loss of the plug member prior to use. It is therefore an object of this invention to provide an improved form of bushing with strain relief.

It is still another object of this invention to provide an improved form of bushing with strain relief wherein the bushing may be installed to an electrical protective enclosure and permit the later assembly thereto of an electrical conductor.

It is yet another object of this invention to provide an improved form of bushing with strain relief wherein the bushing may be assembled first to the conductor and then later assembled to an electrical enclosure or vice versa.

It is yet another object of this invention to provide an improved bushing with strain relief wherein the degree of strain relief may be externally controlled without reference to the insertion of the bushing within a knock-out of electrical protective enclosure.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings:
FIG. 1 is a slide elevation of a bushing constructed in accordance with the concepts of the invention.
FIG. 2 is a fragmentary side elevation of the bushing of FIG. 1 rotated 180° clockwise when viewing the bushing from the right hand portion of FIG. 1.

FIG. 3 is a side elevation of the bushing of FIG. 1 rotated 90° counterclockwise with respect to the FIG. 1, as viewed from the right hand portion of the figure.

FIG. 4 is a front elevation of the bushing of FIG. 3.

FIG. 5 is a rear elevation of the bushing of FIG. 3.

FIG. 1 is a side elevation of a bushing constructed of the bushing of FIG. 1.

FIG. 7 is an alternate construction of the plug member of FIG. 1.

FIG. 8 is a side elevation with an alternate construction of the locking plug member of FIG. 1 inserted into the bushing shown in section and describing an alternate pawl assembly.

FIG. 9 is a side elevation of the bushing of FIG. 1 positioned within the knock-out of an electrical enclosure and having a conductor assembled thereto.

FIG. 10 is a sectional view of FIG. 9 to show the internal details of the bushing.

Similar elements are given similar reference characters in each of the respective figures.

DESCRIPTION OF THE PREFERRED EMBODIMENTS

Turning now to FIGS. 1 to 5 there is shown a bushing 20 constructed in accordance with the concepts of the invention. Bushing 20 includes a first body portion 22 and a second body portion 24 separated by a flange 26. The flange 26 is proportioned so that the bushing 20 may not be passed entirely through an aperture to which the bushing is to be fixed. Mounted upon the first body portion 22 are cantilever mounted flexure members 28, having an inclined face 30 to facilitate entry of the bushing within the knock-out of an electrical protective enclosure. As the bushing 20 is inserted within such knock-out, engagement of the portion of the enclosure wall about the knock-out will ride along the inclined surface 30 of the flexure members 28 causing them to be deflected out of the path to their retracted position. As soon as the first body portion 22 has been permitted to pass entirely through the aperture, ending contacts along the surface 30 of the flexure members 28, the flexure members 28 will return to their initial positions as shown in FIG. 3, thus engaging the bulkhead about the aperture in which the bushing 20 has been placed. The bushing 20 is now locked between the flange 26 and the upwardly extending edge 33 of the flexure members 28.

Positioned in the second body portion 24 is a first aperture 32, as is seen in FIG. 1, and a second aperture 34, as is seen in FIG. 2. Positioned within the aperture 32 are pawl means 36 and surrounding the aperture 32 are guide means 38. The guide means will be positioned in such a manner as to facilitate the entry of the plug member 40 therein. The thickness of the plug member 40, with respect to the separation between guide members 38, is such that an interference fit will be created between the plug member 40 and the guide members 38 when plug member 40 is inserted in aperture 32. Additionally, the plug member 40 is provided with a set of ratchet teeth 42 which are engageable by the pawls 36, in a one way arrangement, whereby the plug member 40 may be inserted into the aperture 32 and upon engagement of the pawls 36 with the rachet teeth 42 it will not be possible to withdraw the plug member 40, nor will it be possible for axial forces applied to a conductor placed through the bushing 20 and engaged by the plug member 40, to force the plug member 40 out of engagement therewith and thus remove the desired strain relief. Tether 44 couples the plug member 40 to the bushing 20 to prevent unwanted separation of the parts prior to assembly. Plug member 40 may be assembled within the aperture 32 with, or without, removal of the tether 44 as is desired.

The action of the plug member 40 upon a conductor positioned within the axial passage 46 extending through the bushing 20, as better seen in FIGS. 4 and 5, will cause the deforming of the conductor to enter the aperature 34 and thus increase the strain relief capability of the bushing 20. Edge 49, of body portion 24, as well as the flange 26 will prevent the movement of the conductor out of the axial passage 46 upon the positioning of the plug member 40 in the aperture 32.

Some very important features should now be noted with respect to the instant invention. In that the strain relief function and the bushing function are in two separate portions of the bushing 20 it is possible to install device within the knock-out of an electrical enclosure without having to install the conductor at the same time. Thus the bushing 20 may be preinstalled in the knock-out of an electrical enclosure and the conductor may be added at a later time. Further, since the strain relief is not applied at the same time as the bushing 20 is positioned within the knock-out of an electrical enclosure it is not necessary that the conductor be held rigidly in its desired position at the time of installation of the bushing 20. Secondly, it should be noted that the entire bushing 20 may be assembled to the conductor ends by engaging the conductor by the plug member 40 and then forcing the assembled conductor and bushing 20 into the knock-out of the electrical enclosure. It should also be noted that the degree of strain relief in no way is determined by the size of the aperture into which the bushing 20 is positioned. As much as is required to properly hold the conductor may be applied directly to the plug member 40 whose action is completely independent of the insertion of the bushing 20 within the knock-out electrical enclosure. Further, because of the independence of the strain relief from bushing insertion, proper strain relief can be applied to a wide range of conductor sizes.

As is shown in FIG. 4, bushing 20 has a rectangular shaped throat 46, however, this configuration is not necessary and the throat may be made such as to provide a circular passage 50 as is shown in FIG. 6. Also, as is shown in FIG. 1 the article engaging surface 48 of the plug member 40 is shown to be convex. However, if desired and based upon the type of conductor employed, its shape and the composition of the sheath, the plug member 52 may be provided with a convex article engaging surface 54 as is shown in FIG. 7. Alternatively, the plug member of FIG. 1 may be modified in the form of a split bolt 56 having a head portion 58 to limit the insertion of the plug member 56 into its aperture 32 and a split body portion 60, having ratchet teeth 62 thereon. The body portion 24 is altered so that pawl members 64 will extend downwardly instead of the pawl members 36 extending outwardly as is shown in FIG. 1. The engagement of the pawl members 64 with the rachet teeth 62 prevent withdrawal of the plug member 56. Further, the split body portion 60 provides for maximum engagement between the rachet teeth 62 and the pawls 64.

Turning now to FIGS. 9 and 10 there is shown a complete assembly of the bushing 20 within the aperture 70 of an electrical protective enclosure wall 72 with a conductor 74 positioned within the bushing 20. The first bushing portion 22 is positioned so that the flange 26 engages the first surface of the wall 72 and the upwardly extending edge 33 engages the rear surface of the enclosure wall 72. The plug 40 has been inserted within the aperture 32 as is shown. As is shown in better detail in FIG. 10, insertion of the plug member 40 has caused a deflection of a portion of the conductor 74 into the aperture 34 and is supported by the rear edge 49 of body portion 24. Rachet teeth 42, of the plug member 40, are engaged by the pawls 36 locking plug member 40 in its position within the aperture 32. In addition, the guide members 38 are spaced apart a distance somewhat less than the thickness of the plug member 40, also operate by means of an interference fit with the plug member 40 to retain plug member 40 in the aperture 32. The conductor 74 then passes through the throat 46, the body portion 22 into the electrical enclosure.

As was stated above, the bushing 20 may be preassembled to the conductor 74 because of the action of plug member 40 with respect to the conductor 74 being independent in the insertion of the bushing 20 within the knock-out of an electrical encosulre. In a similar fashion, the bushing 20 may be preassembled to the knock-out of an electrical enclosure and the conductor 74 later installed through the throat 46 within the bushing 20. Finally, since the holding power, or degree of strain relief, provided by the plug member 40 is totally independent of the application of the bushing into the electrical enclosure wall the desired degree of strain relief may be provided by proper insertion of the plug member 40. Such strain relief will continue throughout the life of the bushing.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A bushing to protect the passage of an article through an aperture in a bulkhead comprising: a first body portion; a second body portion; a flange coupled between said first and second body portions; said flange being proportioned to prevent said bushing from passing through said aperture when said first body portion is inserted into said aperture; said first and second body portions and said flange having aligned axial passages therethrough for receipt of an article therein; flexure members on said first body portion taking a first position to prevent withdrawal of said bushing from said aperture after said first body portion is inserted therein; said flexure members taking a second position during insertion of said first body portion in said aperture to prevent interference therewith; a first aperture in said second body portion; a plug member proportioned to fit within said first aperture; and locking means on said plug member to prevent withdrawal of said plug member after insertion into said first aperture; said plug member when inserted in said first aperture engaging an article placed in said axial passages of said first and second body portions and said flange to prevent withdrawal of said article from said bushing.

2. A bushing, as defined in claim 1, wherein said flexure members are cantilever mounted upon said first body portion and have an inclined outer surface to facilitate their movement from said first position to said second position as said bushing is inserted into said aperture.

3. A bushing, as defined in claim 1, wherein said second body portion has a second aperture opposite said first aperture whereby the insertion of said plug member into said first aperture causes said article to be positioned within said second aperture.

4. A bushing, as defined in claim 1, wherein said locking means on said plug member are a series of rachet teeth and said second body member further comprises pawl members mounted adjacent said first aperture for engagement with said rachet teeth of said plug member to prevent withdrawal thereof.

5. A bushing, as defined in claim 4, wherein guide ribs are coupled to said second body portion adjacent said first aperture to guide said plug member into said first aperture and to seize said plug member to aid in the prevention of the withdrawal of said plug member.

6. A bushing, as defined in claim 4, wherein the article engaging surface of said plug member is convex.

7. A bushing, as defined in claim 4, wherein the article engaging surface of said plug member is concave.

8. A bushing, as defined in claim 1, further including a tether means coupling said plug member to said bushing to prevent unwanted separation of said plug member from said bushing.

9. A bushing, as defined in claim 8, wherein said tether means may be selectively removed from said bushing and said plug member.

10. A bushing, as defined in claim 4, wherein said plug member is partially split to provide a positive locking force between said rachet teeth and said pawl members.

References Cited

UNITED STATES PATENTS

| | | | |
|---|---|---|---|
| 3,141,062 | 7/1964 | Papata | 16—2 X |
| 3,243,206 | 3/1966 | Samer | 16—2 X |
| 3,249,687 | 5/1966 | Klumpp | 174—153 |
| 3,424,856 | 1/1969 | Coldren | 248—56 X |

CHANCELLOR E. HARRIS, Primary Examiner

U.S. Cl. X.R.

16—2; 174—153

PO-1050
(5/69)

UNITED STATES PATENT OFFICE
CERTIFICATE OF CORRECTION

Patent No. 3,493,205          Dated February 3, 1970

Inventor(s) Menashe Bromberg

It is certified that error appears in the above-identified patent and that said Letters Patent are hereby corrected as shown below:

Column 2, line 22, delete "theirin" and insert -- therein --

Column 3, line 6, delete "FIG. 1 is a side elevation of a bushing constructed of the bushing of FIG. 1." and insert -- FIG. 6 is a rear elevation of an alternate construction of the bushing of FIG. 1. --

Column 5, line 5, delete "encosulre" and insert -- enclosure --

SIGNED AND
SEALED
JUN 30 1970

(SEAL)
Attest:

Edward M. Fletcher, Jr.
Attesting Officer

WILLIAM E. SCHUYLER, JR.
Commissioner of Patents